S. DANIELS.
MAPLE SAP EVAPORATOR.
APPLICATION FILED MAR. 22, 1910.

974,475.

Patented Nov. 1, 1910.
4 SHEETS—SHEET 1.

WITNESSES:
M. A. Atwood.
Frank G. Parker.

INVENTOR:
Samuel Daniels
By Leury Williams
Att'y.

S. DANIELS.
MAPLE SAP EVAPORATOR.
APPLICATION FILED MAR. 22, 1910.

974,475.

Patented Nov. 1, 1910.
4 SHEETS—SHEET 3.

WITNESSES:
M. A. Atwood.
Frank G. Parker

INVENTOR
Samuel Daniels
By Henry Williams
Att'y.

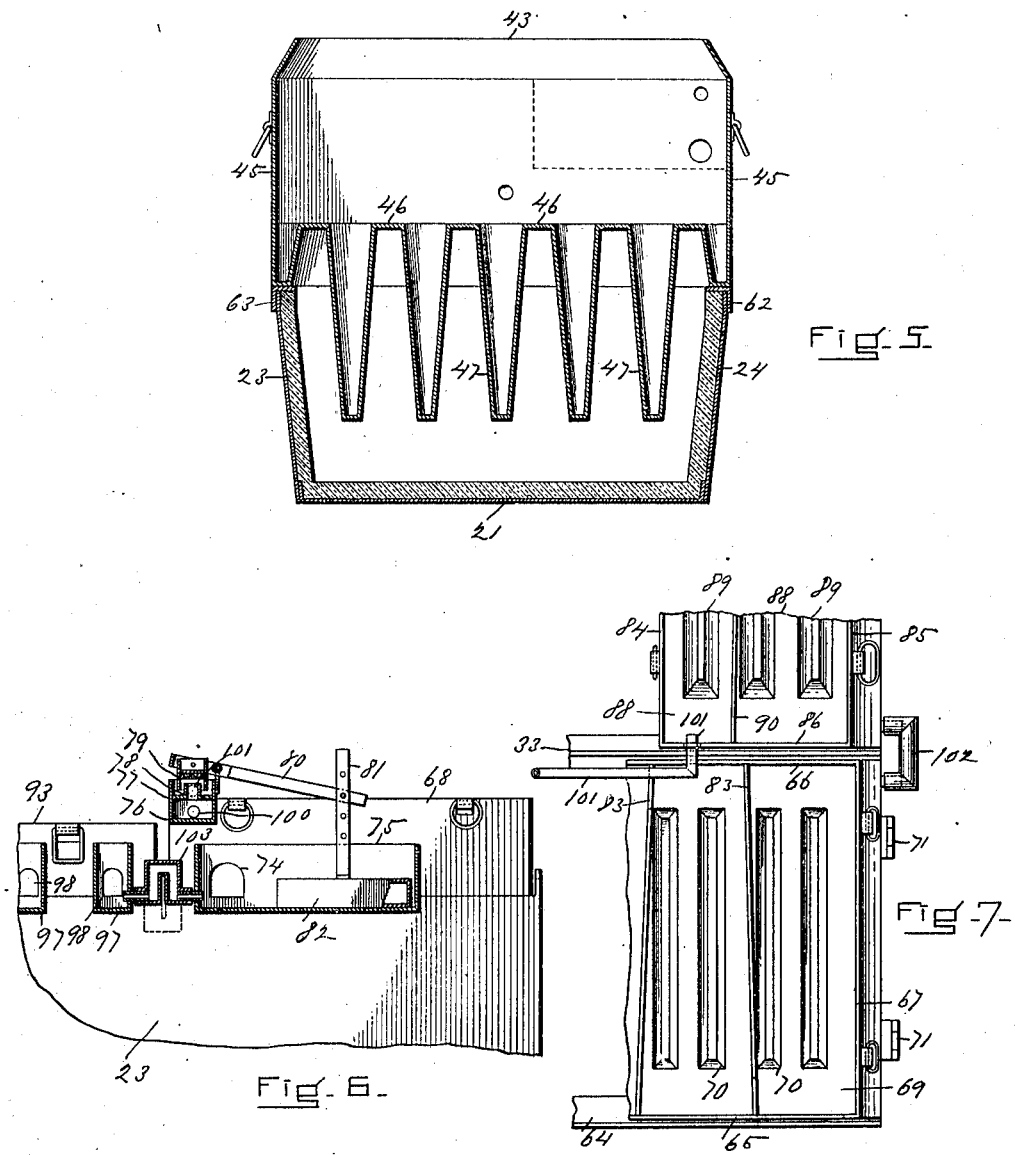

UNITED STATES PATENT OFFICE.

SAMUEL DANIELS, OF HARDWICK, VERMONT.

MAPLE-SAP EVAPORATOR.

974,475. Specification of Letters Patent. Patented Nov. 1, 1910.

Application filed March 22, 1910. Serial No. 550,966.

*To all whom it may concern:*

Be it known that I, SAMUEL DANIELS, a citizen of the United States, residing at Hardwick, in the county of Caledonia and State of Vermont, have invented new and useful Improvements in Maple-Sap Evaporators, of which the following is a specification.

This invention relates to a new and improved apparatus for evaporating maple sap; and it consists in certain novel constructions and arrangements of parts fully described below and illustrated in the accompanying drawings, whereby while the sap is being fed evenly and its flow automatically regulated the heat is distributed and applied in such a manner with relation to the sap during the progress of its flow as to prevent burning, whereby the boiling pans may be easily and quickly drained, whereby the heat applied to the syruping-off pans is rendered less direct and of a less degree of intensity than that applied to the boiling pans, whereby the siphon connections between the syruping-off pans and between said pans and the regulating float-mechanism intermediate of the syruping-off pans and the boiling pans are rendered adjustable, and whereby the operation of evaporating the sap into syrup of the desired consistency and legal weight to the gallon is in other respects facilitated and accomplished with economy.

Figure 1:
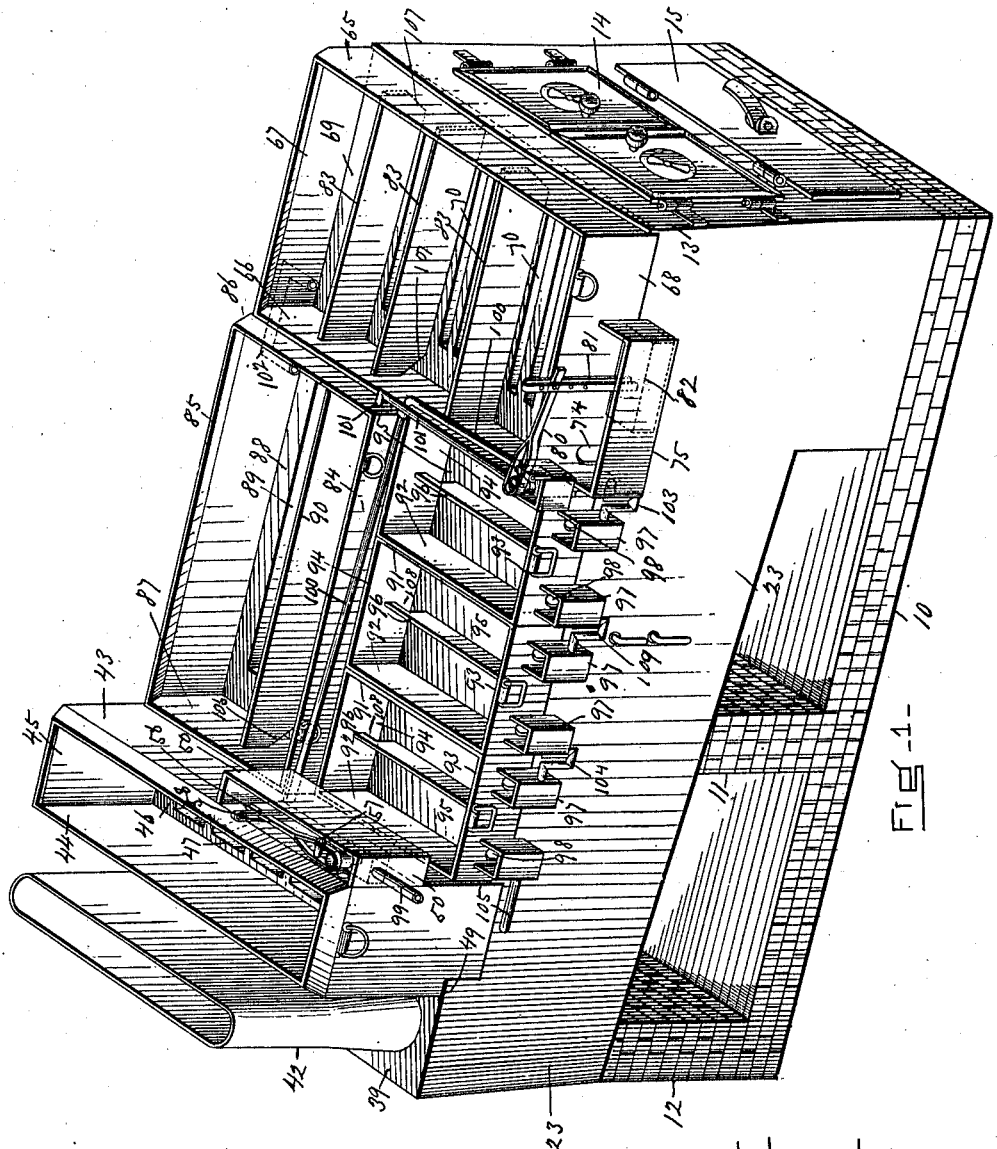
Figure 2:
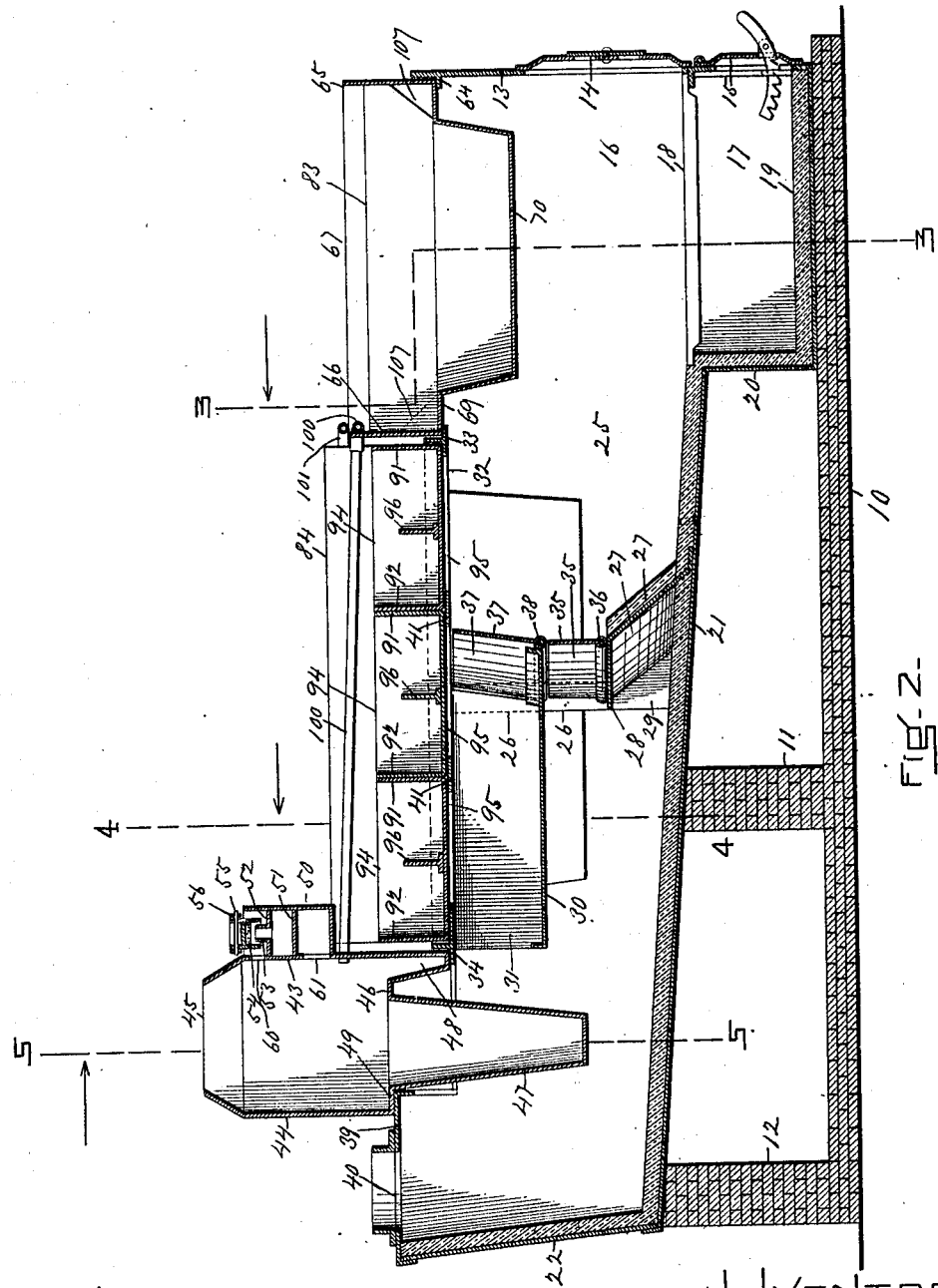
Figure 3:
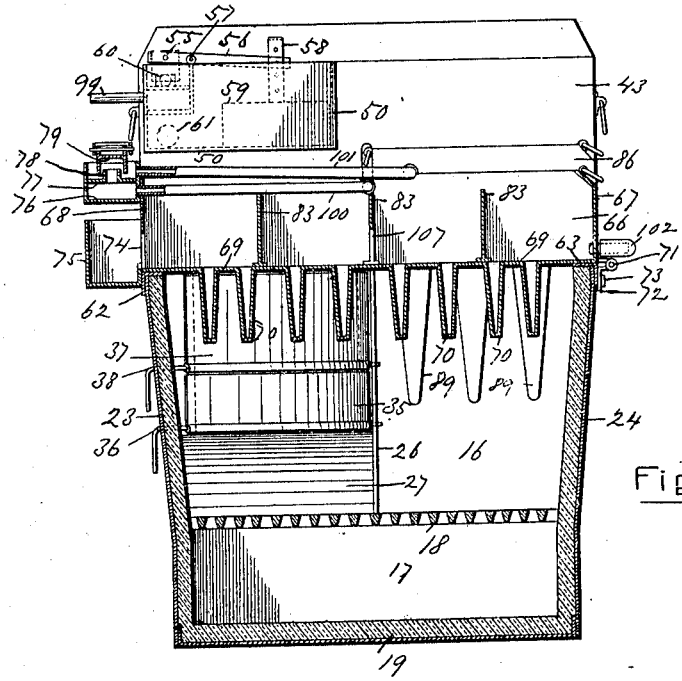
Figure 4:
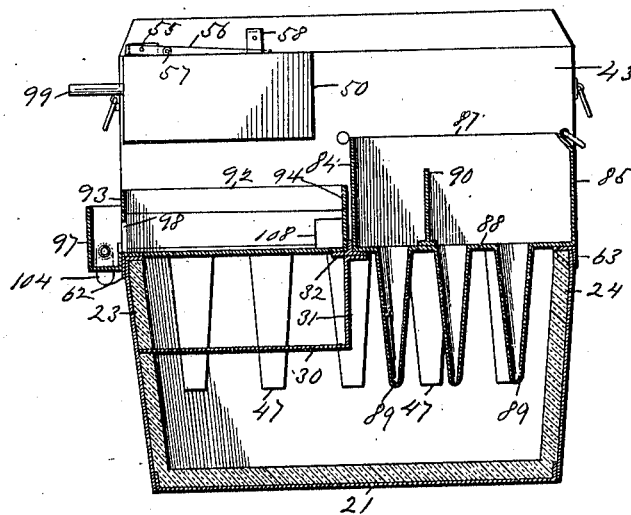

In the drawings, Figure 1 is a perspective view of my improved maple sap evaporator. Fig. 2 is a longitudinal vertical section of the apparatus taken through the series of syruping-off pans. Fig. 3 is a vertical section taken on line 3—3, Fig. 2, looking toward the left. Fig. 4 is a vertical section taken through line 4—4, Fig. 2, looking toward the left. Fig. 5 is a vertical section taken through line 5—5, Fig. 2, looking toward the right. Fig. 6 is a vertical section in detail taken longitudinally with the apparatus through the float and regulating device next the syruping-off pans. Fig. 7 is an enlarged plan view or detail showing portions of the two partitioned boiling pans.

Similar numerals of reference indicate corresponding parts.

Reference-numeral 10 represents the base, and 11 and 12 transverse walls, all preferably made of masonry, for supporting the apparatus, and more directly the heating portion of the apparatus. In this heating portion 13 is the front wall provided with the ordinary doors 14 and 15, the former opening into the combustion-chamber 16, and the latter into the ashpit 17.

18 is the grate.

The bottom 19 of the ashpit rests directly on the base 10, and from its rear wall 20 there extends rearward and longitudinally with the apparatus a floor 21 inclined upward toward the rear to the rear wall 22, said floor and rear wall resting on the walls 11 and 12.

23 and 24 represent the two opposite side walls of the heating portion of the apparatus.

Within the heating chamber 25 is an arch supported by the floor 21, and located on one side of a longitudinal line drawn centrally through the apparatus. This arch which is supported at its opposite ends by the wall 23 and an upright 26 consists of the front wall 27 extending from the side wall 23 inward to substantially one-half the distance between the walls 23 and 24 (see Figs. 2 and 3) said wall 27 being inclined or set at a rearward angle, as illustrated in Fig. 2, a substantially horizontal wall 28 extending rearward from the upper edge of the portion 27, and a substantially vertical wall or partition 29 extending rearward from the inner edges of the walls or plates 27 and 28.

At a short distance above the arch is a flue or passage produced by the horizontal plate 30 extending inward from the wall 23 to the upright 26, and the vertical plate or partition 31 extending up from the inner edge of the plate 30 to the longitudinal bar 32 which with the two cross bars 33 and 34 resting on the upper edges of the side walls 23 and 24 constitute a hog-frame for the purpose below described. A damper 35 is hinged at 36 to the top of the arch 27 and 28 and swings upward to close the space between the plates 28 and 30, and a damper 37 is hinged at 38 to the front edge of the plate 30 and swings upward to close the space above said plate 30, and both the dampers are set diagonally with relation to the wall 23, their right ends (looking rearward) being next the upright 26 and their left ends being in line with the handles 109 (Fig. 1) *i. e.*, nearer the front wall 13 than the upright—the object of said dampers being described below. The rear portion 39 of the heating part of the apparatus extends upward, as illustrated in Figs. 1 and 2, and at 40 is provided with the port or passage which extends into the smoke-flue 42 and thence into the chimney. Additional cross bars 41 extend from the bar 32 to the wall 23, for the purpose below described, and all the bars 32, 33, 34 and 41 are preferably of reverse T-shape.

43 and 44 represent the front and rear walls and 45 the end walls of the heater, which is a deep tank set transversely with the apparatus in front of the flue 42. Its bottom 46 is provided with a series of very deep sap-ways 47 (Figs. 2, 4 and 5) consisting of separate hollow legs opening up to the bottom or floor. A hollow downward extension 48 rests on a horizontal portion of the cross bar 34, and a shoulder 49 rests on the rear part 39 of the apparatus. Secured to the front wall 43 is an automatically regulating feeder or filler into which the sap is introduced through an inlet or feed-pipe 99. This feeder (which is not new in itself considered) comprises a box of which 51 and 52 are the bottom and top secured rigidly in a comparatively long tray or tank 50 near its upper edge. The top 52 of the box is provided with a port surrounded by an upwardly extending ring or flange 53 which constitutes a seat for a valve 54 pivotally connected at 55 to the lever 56 which is pivotally supported at 57 by the tank 50. The opposite end of the lever is connected adjustably to the slotted upright 58 rigidly secured at its lower end to the float 59. A passage 60 connects the interior of the heater with the flange above the partition 52, and a passage 61 connects the interior of the heater with the tank 50 below the box.

62 and 63 are angle bars resting on the tops of the side walls 23 and 24, and 64 is an angle bar resting on the top of the front wall 13.

Transversely disposed at the front end of the apparatus and resting on the angle bars 62, 63 and 64 and on the T-shaped bar 33 is a boiling pan or heating pan consisting of the front wall 65, rear wall 66, side or end walls 67 and 68, bottom 69, partitions 83, and sap-ways 70 extending downward from the bottom but less deep than the sap-ways 47. See Figs. 1, 2, 3 and 7. The end at the wall 67 is removably connected to the wall 24 by hinges 71 whose leaves 72 drop into hasps or staples 73 (Fig. 3) whereby the pan may be swung up or entirely removed from the apparatus. The wall 68 is provided with a port or passage 74 leading into the tray or tank 75 which makes a part of a feeder (Figs. 1, 3 and 6) similar in construction to the feeder secured to the front wall 43 of the heater, and its parts 75, 76, 77, 78, 79, 80, 81 and 82 correspond to the parts 50, 51, 52, 53, 54, 56, 58 and 59, except that the box 76, 77 is raised from the tray and sustained at a short distance above it.

Longitudinally disposed and supported by the T-shaped bars 32, 33 and 34 and the angle bar 63 is a boiling pan comprising side walls 84 and 85, end walls 86 and 87, bottom 88, sap-ways 89, and a longitudinal partition 90, the sap-ways reaching to about the same depth as the sap-ways 47 but being somewhat shorter as the bottom 46 is higher than the bottom 88. See Figs. 1, 2, 3, 4 and 7.

Transversely placed between the longitudinal boiling pan and the side wall 23 and between the front boiling pan and the heater and supported by the T-shaped bars 32, 33 and 34 and angle bar 62 are a series of syruping-off pans each consisting of side walls 91 and 92, end walls 93 and 94, a flat bottom 95 without sap-ways, and a partition 96. Each of the syruping-off pans supports on the outer side of its wall 93 a pair of deep trays or small tanks 97 connected by a passage 98 with the interior of the pan. Figs. 1, 4 and 6. Preferably the bars 41 above referred to are located under the joints between the syruping-off pans to prevent smoke etc. from escaping at those points.

The inlet pipe 99 opens into the box supported in and making a part of the feeder secured to the wall 43 of the heater (Figs. 1, 3 and 4), and a pipe 100 extends from the interior of the heater through the wall 43 along the outer side of the boiling pan wall 84 and along the top of the wall 66 of the front boiling pan through the wall 68 of the same pan into the box below the valve making a part of the feeder supported by the boiling pan wall 68. Figs. 1, 2, 3 and 6. A pipe 101 connects with the interior of the box making a part of the last named feeder above the valve and extends through the wall 68 above the pipe 100 and thence along the boiling pan wall 66 and the wall 86 into the longitudinal boiling pan. The longitudinal boiling pan and the transverse boiling pan are connected by a pipe 102. Figs. 1, 3 and 7. A siphon-pipe 103 connects the tray 75 of the feeder with the adjacent tray 97 supported by the first syruping-off pan, and another siphon-pipe 104 connects the adjacent trays 97 in adjoining syruping-off pans, the last tray 97 being provided with an outlet or discharge pipe 105 for delivering the completed product or syrup. The ends of the siphon pipes 103 and 104 are swiveled in the feeder tank 75 and in the tray 97 whereby these pipes may be swung up into the siphoning position illustrated in Fig. 6 from the dropped position shown in Figs. 1 and 4.

The partition 90 in the longitudinal boiling pan is provided with a port or passage 106 at its rear lower corner, the partitions 83 in the front boiling pan are provided with passages 107 in the front and rear lower corners alternately, and the partitions 96 in the syruping-off pans are provided with similarly arranged passages 108.

In practice, the sap is allowed to flow through the inlet pipe 99 into the feed mechanism supported by the wall 43 of the heater and through the valve 53, 54 and port 60 into the heater, filling the sap-ways and the heater to the level of the pipe 100, flowing through said pipe into the feed mechanism supported by the wall 68 and entering the box secured thereto between the parts 76 and 77; thence the sap passes up through the valve 78, 79 and enters the pipe 101 passing through it into the longitudinal boiling pan and through the passage 106, filling the sap-ways 89 and the pan to the level of the pipe 102 through which it passes into the front boiling pan and fills the sap-ways 70, passing through the passages 107 in order to fill all the sap-ways. Thus having entered near the side wall 67 it reaches the side wall 68 and passes through the port 74 into the tray 75 of the feeder secured to said side wall 68, and thence (the siphon-pipes 103, 104 being swung down as in Fig. 1) the sap passes through the siphon-pipe 103 into the first tray 97 and through the port 98 therein into the first syruping-off pan, along the partition 96 and through it by means of the passage 108 into the farther compartment of this pan, thence out through the second port 98 in the front wall 93 into the second tray 97, through the siphon-pipe 104 into the first compartment in the second pan, and so on to the outlet pipe 105. After the pipes 103, 104 are all filled they may be swung up into the position illustrated in Fig. 6, and they then operate as siphons. Usually the sap is allowed to enter the boiling pans from the heater (whose bottom sets higher than the bottoms of the boiling pans) until it reaches a height of say three-fourths of an inch above the bottoms 88 and 69 of the boiling pans.

When starting the fire the lower damper 35 is swung up and thus closed and the upper damper 37 is swung down into an open position. After a suitable time the upper damper is swung up into a closed position as shown in Figs. 2 and 3, and after that the draft is controlled by the lower damper.

As the arch consisting of the rearwardly inclined wall 27, horizontal wall 28, partition 29, horizontal plate 30, and partition 31, is entirely on one side of a central line drawn longitudinally through the apparatus it is evident that when the dampers are closed the direct heat is shut off from under the syruping-off pans and strikes directly the two boiling pans with their sap-ways 70 and 89, being deflected by the diagonally placed wall 27 and diagonally disposed dampers 35 and 37 to the right of said central line, so that the direct and greatest heat is applied to the boiling pans and afterward to the heater at the rear end of the apparatus and its sap-ways 47. The heat reaches the syruping-off pans indirectly, that is, after passing around to the rear of the arch, and even then producing less effect as the syruping-off pans have no sap-ways. As the water is being boiled out of the sap during the progress of said sap through the boiling pans and around the partitions, the sap is thicker when it reaches the syruping-off pans, and too great heat on said pans would burn it. Practically about ninety per cent. of the bulk of the sap is evaporated off by the boiling process whereby the "sweet sap" or syrup reaches a weight of about eleven pounds to the gallon.

When a proper height is reached by the sap the floats 59 and 82 operate to close the valves and thus shut off the flow, practically keeping the sap in the heater at an even depth and also regulating the depth of the sweet sap or syrup in the syruping-off pans.

The sap-ways are made long enough or deep enough to catch the heat in the bottom of the arch and provide a large heating area.

The longitudinal partition in the longitudinally placed boiling pan is not quite parallel with the side walls 84 and 85, but is set at such an angle that when this boiling pan is tipped toward the right, that is, with its side wall 85 swung down and the side wall 84 swung up, for draining purposes for example, the sap which has entered through the pipe 101 between the partition and the wall 84 will run down said partition to the port or passage 106 and through said passage to the compartment between the partition and the wall 85, from which it can be poured out over the wall 85 or drained out through the passage leading to the pipe 102 which can be removed for the purpose. In the transversely arranged boiling pan the partitions 83 are non-parallel with the end walls 67 and 68, and are also non-parallel with each other, they being so set that when the end wall 68 of the pan is swung up for draining purposes the liquid will flow in a zigzag course down each partition 70 to and through the passage 107 until it reaches the wall 67 when the liquid can be drained or poured over said wall or through the passage leading to the pipe 102. When the pan is thus tipped up each passage or port 107 will be at the lower end of the partition 83 through which it extends.

The feeder at the corner of the front boiling pan next the syruping-off pans is so constructed that it keeps the longitudinal boiling pan at an even depth, and as syrup is drawn off from the last syruping-off pan the feeder is started and holds all the pans at an even depth, thus preventing burning of the front pan.

The sap from the heating pan enters the longitudinal boiling pan at the hottest place in the apparatus, and its three deep sap-ways are so proportioned as to hold the right amount of sap to the square foot of heating surface whereby steaming is easy, and said sap-ways are large enough to be washed and cleaned out. The skimming may be all done in this boiling pan if desired, and the deep sap-ways catch the heat near the very bottom of the arch.

The front pan is constructed on practically the same principle and receives the direct heat.

The heater near the rear end of the apparatus is so constructed as not to interfere with the draft of the arch, and is proportioned to give the right amount of heated sap for the evaporating or boiling pans. By reason of the depth of the arch a large combustion chamber is provided, and the dampers being set at an obtuse angle with the direction of the draft deflect the heat to the longitudinal boiling pan and also regulate the amount of heat to be thrown against the syruping-off pans.

When the syruping-off pans have been supplied to a suitable depth through the pipes 103 and 104, and said pipes have been swung up so as to operate as siphon pipes, the pipes and syruping-off pans may be left as the siphons operate by themselves.

Having thus fully described my invention, what I claim, and desire to secure by Letters Patent, is:—

1. In a sap evaporator of the character described, a heating apparatus comprising side walls, a rear wall and a front wall and containing a heating chamber; an arch located on one side of a substantially central line drawn longitudinally through the heating chamber; a boiling or evaporating pan supported by the heating apparatus above the heating chamber between the arch and the opposite side wall of the heating apparatus; a boiling or evaporating pan supported by the heating apparatus at the front end thereof in front of the arch; and syruping-off pans supported by the heating apparatus and located on that side of the apparatus containing the arch, for the purpose set forth.

2. In a sap evaporator of the character described, a heating apparatus comprising side walls, a rear wall and a front wall and containing a heating chamber; an arch located on one side of a substantially central line drawn longitudinally through the heating chamber, the front wall of said arch extending diagonally from one of the walls of the heating apparatus rearward toward said central line; a boiling or evaporating pan supported by the heating apparatus above the heating chamber between the arch and the opposite side wall of the heating apparatus; a boiling or evaporating pan supported by the heating apparatus at the front end thereof in front of the arch; and syruping-off pans supported by the heating apparatus and located on that side of the apparatus containing the arch, for the purpose set forth.

3. In a sap evaporator of the character described, a heating apparatus comprising side walls, a rear wall and a front wall and containing a heating chamber; an arch located on one side of a substantially central line drawn longitudinally through the heating chamber, the front wall of said arch being provided with dampers and said wall and dampers extending diagonally from one of the walls of the heating apparatus rearward toward said central line; a boiling or evaporating pan supported by the heating apparatus above the heating chamber between the arch and the opposite side wall of the heating apparatus; a boiling or evaporating pan supported by the heating apparatus at the front end thereof in front of the arch; and syruping-off pans supported by the heating apparatus and located on that side of the apparatus containing the arch, for the purpose set forth.

4. In a sap evaporator of the character described, a heating apparatus comprising side walls, a rear wall and a front wall and containing a heating chamber; an arch located on one side of a substantially central line drawn longitudinally through the heating chamber, the front wall of said arch being provided with dampers and said wall and dampers extending diagonally from one of the walls of the heating apparatus rearward toward said central line; a substantially vertical wall extending rearward from the inner end of the arch; a boiling or evaporating pan supported by the heating apparatus above the heating chamber between the arch and the opposite side wall of the heating apparatus; a boiling or evaporating pan supported by the heating apparatus at the front end thereof in front of the arch; and syruping-off pans supported by the heating apparatus and located on that side of the apparatus containing the arch, for the purpose set forth.

5. In a sap evaporator of the character described, a heating apparatus comprising side walls, a rear wall and a front wall and containing a heating chamber; an arch located on one side of a substantially central line drawn longitudinally through the heating chamber, the front wall of said arch being provided with dampers and said wall and dampers extending diagonally from one of the walls of the heating apparatus rearward toward said central line; a substantially vertical wall extending rearward from the inner end of the arch; a flue located above the arch and extending rearward therefrom and comprising a substantially horizontal bottom and a substantially vertical side wall located centrally and longitudinally in the heating chamber; a boiling or evaporating pan supported by the heating apparatus above the heating chamber between the arch and the opposite side wall of the heating apparatus; a boiling or evaporating pan supported by the heating apparatus at the front end thereof in front of the arch; and syruping-off pans supported by the heating apparatus and located on that side of the apparatus containing the arch, for the purpose set forth.

6. In a sap evaporator of the character described, a heating apparatus comprising side walls, a rear wall and a front wall and containing a heating chamber; an arch located on one side of a substantially central line drawn longitudinally through the heating chamber, the front wall of said arch being provided with dampers and said wall and dampers extending diagonally from one of the walls of the heating apparatus rearward toward said central line; a substantially vertical wall extending rearward from the inner end of the arch; a flue located above the arch and extending rearward therefrom and comprising a substantially horizontal bottom and a substantially vertical side wall located centrally and longitudinally in the heating chamber; a boiling or evaporating pan supported by the heating apparatus above the heating chamber between the arch and the opposite side wall of the heating apparatus; a boiling or evaporating pan supported by the heating apparatus at the front end thereof in front of the arch; and syruping-off pans supported by the heating apparatus and located on that side of the apparatus containing the arch above the open upper side of said flue, for the purpose set forth.

7. In a sap evaporator of the character described, a heating apparatus; an arch located on one side of a substantially central line drawn longitudinally through the heating chamber in said heating apparatus; syruping-off pans supported by the heating apparatus on the side which contains the arch; a longitudinal boiling or evaporating pan supported by the heating apparatus directly over the heating chamber; a transverse evaporating or boiling pan supported by the heating apparatus in front of the longitudinal pan and the syruping-off pans; a heater transversely supported by the heating apparatus at the rear of the longitudinal pan and the syruping-off pans; a regulating feeder connecting with the interior of the heater and adapted to receive the sap; a regulating feeder secured to and connecting with the front transverse evaporating pan; a pipe connecting the interior of the heater on the rear portion of the apparatus with the regulating feed secured to the transverse evaporating or boiling pan; a pipe connecting the feed secured to the transverse evaporating pan with the longitudinal evaporating or boiling pan; and tubular connections intermediate of the feeder secured to the transverse evaporating pan and syruping-off pans.

In testimony whereof I have signed my name to this specification in the presence of two subscribing witnesses.

SAMUEL DANIELS.

Witnesses:
B. E. BULLARD,
HARRY A. SHEPARD.